US006624856B2

(12) United States Patent
Watanabe et al.

(10) Patent No.: US 6,624,856 B2
(45) Date of Patent: Sep. 23, 2003

(54) LIQUID CRYSTAL DISPLAY DEVICE HAVING THIN FILM TRANSISTORS FOR REDUCING LEAK CURRENT

(75) Inventors: Hitoshi Watanabe, Tachikawa (JP); Shinichi Shimomaki, Akishima (JP); Yayoi Nakamura, Hino (JP)

(73) Assignee: Casio Computer Co., Ltd., Tokyo (JP)

( * ) Notice: Subject to any disclaimer, the term of this patent is extended or adjusted under 35 U.S.C. 154(b) by 209 days.

(21) Appl. No.: 09/899,803

(22) Filed: Jul. 3, 2001

(65) Prior Publication Data
US 2002/0003589 A1 Jan. 10, 2002

(30) Foreign Application Priority Data

Sep. 25, 2000 (JP) ........................ 2000-289987
Jul. 7, 2000 (JP) ........................ 2000-206758

(51) Int. Cl.[7] .................. G02F 1/136; H01L 29/04; H01L 31/036; H01L 31/0376
(52) U.S. Cl. .............. 349/44; 349/43; 349/42; 349/46; 257/59; 257/72
(58) Field of Search ............... 349/42, 43, 44, 349/46; 257/59, 72

(56) References Cited

U.S. PATENT DOCUMENTS

| 5,719,078 A | * | 2/1998 | Kim | 438/158 |
|---|---|---|---|---|
| 5,736,436 A | | 4/1998 | Matsumoto et al. | |
| 5,811,846 A | * | 9/1998 | Miura et al. | 257/291 |
| 5,835,171 A | * | 11/1998 | Hanazawa et al. | 349/43 |
| 5,838,399 A | * | 11/1998 | Someya et al. | 349/46 |
| 5,994,717 A | * | 11/1999 | Igarashi et al. | 257/59 |
| 6,078,367 A | * | 6/2000 | Satou | 349/46 |
| 6,249,325 B1 | * | 6/2001 | Ohkawara et al. | 349/38 |
| 6,310,668 B1 | * | 10/2001 | Ukita | 349/42 |
| 6,392,721 B1 | * | 5/2002 | Ochiai et al. | 349/42 |
| 6,424,389 B1 | * | 7/2002 | Ono et al. | 349/43 |

FOREIGN PATENT DOCUMENTS

| JP | 03080225 A | * | 4/1991 | ......... G02F/1/136 |
|---|---|---|---|---|
| JP | 04078826 A | * | 3/1992 | ......... G02F/1/1343 |

* cited by examiner

Primary Examiner—John F. Niebling
Assistant Examiner—Jennifer M. Kennedy
(74) Attorney, Agent, or Firm—Frishauf, Holtz, Goodman & Chick, P.C.

(57) ABSTRACT

According to the present invention, a channel protection film is formed a little smaller in area than the gate electrode formed of a shielding metal film. A semiconductor thin film is formed such that the thickness is set not less than 200 Å and less than 400 Å. A distance A between the edge of the gate electrode in the channel length direction and the edge of the channel protection film is set around 0.2–1.2 $\mu$m, and a distance B between the edge of the gate electrode in the channel width direction and the edge of the channel protection film is set around 1–2 $\mu$m. With this constitution, the leak current of the thin film transistor due to the light irradiation can be reduced.

17 Claims, 14 Drawing Sheets

LIQUID CRYSTAL DISPLAY DEVICE HAVING THIN FILM TRANSISTORS FOR REDUCING LEAK CURRENT

CROSS-REFERENCE TO RELATED APPLICATIONS

This application is based upon and claims the benefit of priority from the prior Japanese Patent Applications No. 2000-206758, filed Jul. 7, 2000; and No. 2000-289987, filed Sep. 25, 2000, the entire contents of both of which are incorporated herein by reference.

BACKGROUND OF THE INVENTION

1. Field of the Invention

The present invention relates to a liquid crystal display device having thin film transistors for reducing leak current, and more specifically, relates to an active matrix liquid crystal display device having thin film transistors each of which is provided with a gate electrode made of shielding material.

2. Description of the Related Art

Some of liquid crystal display devices have thin film transistors as switching elements. FIG. 13 is a partly enlarged plan view of such a kind of the conventional liquid crystal display device, and FIG. 14 is an enlarged sectional view taken along XIV—XIV line. The liquid crystal display device is provided with a lower glass substrate 101 and an upper glass substrate 102 bonded to each other by a sealing member (not shown) formed in an approximately square frame and disposed therebetween. Liquid crystal 103 is sealed between the glass substrates 101 and 102 and inside the sealing member.

The lower glass substrate 101 is provided at predetermined portions on the upper face thereof with scanning lines 105 each including a gate electrode 104 and formed of shielding metal material. The scanning line 105 extends in a direction from left to right in FIG. 13. The lower glass substrate 101 provided with the gate electrodes 104 and the scanning lines 105 also has on the upper face a gate insulating film 106 formed of silicon nitride or the like. There is provided a semiconductor thin film 107 formed of intrinsic amorphous silicon on a portion of the upper face of the gate insulating film 106, which is placed directly upper the gate electrode 104. On the upper face of the approximately central portion of the channel length of the semiconductor thin film 107, there is provided a channel protection film 108 formed of silicon nitride or the like. The upper face of the side portions of the channel protection film 108 and the upper faces of source and drain regions of the semiconductor thin film 107 are covered with ohmic contact layers 109 and 110 formed of n-type amorphous silicon.

There are provided signal lines 112 each including a drain electrode 111 and formed of shielding metal material on the predetermined portions of the upper faces of the ohmic contact layer 109 and the gate insulating film 106. The signal line 112 extends in a direction from the upper portion to the lower portion in FIG. 13. The other ohmic contact layer 110 is provided on the upper face thereof with a source electrode 113 formed of shielding metal material. The above-mentioned members, i.e., the gate electrode 104, the gate insulating film 106, the semiconductor thin film 107, the channel protection film 108, the ohmic contact layers 109 and 110, the drain electrode 111, and the source electrode 113 constitute a thin film transistor 114.

There is provided on the gate insulating film 106 an overcoat film 116 so as to entirely cover the thin film transistor 114. The overcoat film 116 is provided on the predetermined portion of the upper face with a plenty of pixel electrodes 117 formed of transparent metal material such as ITO. Each of the pixel electrodes 117 is connected to the source electrode 113 of the corresponding thin film transistor through a contact hole 118 formed in the overcoat film 116. On the other hand, there are provided a black mask 119 and a counter electrode 120 which are formed of metal material such as chromium oxide with relatively low reflectivity, such that the upper glass substrate 102 contacts with them on the lower face. The black mask 119 is formed in a rectangular frame and provided to each of the pixel electrodes so as to enclose the pixel region. The frame is shown in FIG. 13 as a two-dot line, that is arranged to face the scanning line 105 including the gate electrode 104 and the signal line 112 including the drain electrode 111. There is normally provided a first alignment film on the overcoat film 116 and the pixel electrode 117 on lower glass substrate 101, a second alignment film on the counter electrode 120 formed on the glass substrate 102. FIGS. 13 and 14, however, omit these alignment films.

The relationship between the gate electrode 104 and the channel protection film 108 will be described below. The channel protection film 108 is formed by the photolithography technique with use of a mask formed of photoresist subjected to the exposure from the back side (back side exposure) with use of the gate electrode 104 as a mask and the exposure from the front side (front side exposure) with use of a mask (not shown) and then developed. In the backside exposure using the gate electrode 104 as a mask, the photoresist is formed in a size a little smaller than that of the gate electrode 104 in area since light comes inside from the peripheral portion of the gate electrode 104 and the scanning line 105. FIG. 13 shows a value A (a distance between the edge [front edge] of the gate electrode 104 in the direction of the channel length and the edge [front edge] of the channel protection film 108 in the direction of the channel length) and a value B (a distance between the edge [side edge] of the gate electrode 104 in the direction of the channel width and the edge [side edge] of the channel protection film 108 in the direction of the channel width). They are both set around 2–3 $\mu$m, normally.

If the conventional liquid crystal display device as mentioned above is used as a transmissive display, however, light incident from the backlight (not shown) arranged on the lower face of the lower glass substrate 101 is reflected by the blackmask 119. The reflected light transmits through the channel protection film 108 and reaches the semiconductor thin film 107, resulting in the increase of the leak current. On the other hand, it is required now to reduce in width the scanning line 105 including the gate electrode 104 and the signal line 112 including the drain electrode 111 in order to increase the aperture ratio of the liquid crystal display device and form the device more finely. If the values A and B are set at 2–3 $\mu$m as mentioned above, however, the device cannot have larger aperture ratio or be formed more finely. If the values A and B are set smaller, however, the leak current will increase to deteriorate the OFF-performance of the thin film transistor 114, with the result that the display performance will be adversely affected.

BRIEF SUMMARY OF THE INVENTION

The present invention is intended to provide possibility of reducing the leak current from the thin film transistor due to the reflected light transmitting through the channel protection film and reaching the semiconductor thin film of the transistor.

The liquid crystal display device according to an aspect of the present invention comprises a liquid crystal display device comprising: pixel electrodes formed of transparent conductive material; thin film transistors each provided with a gate electrode formed of shielding material and having a front edge, a rear edge, and a pair of side edges, a gate insulating film, a semiconductor thin film, a drain electrode, a source electrode, and a channel protection film smaller than the gate electrode, a thickness of the semiconductor thin film being at least 200 Å and less than 400 Å, each of the pixel electrode having a edge adjacent to the front edge and one of the side edges of the gate electrode, the source electrode extending over the front edge of the gate electrode to be connected with the pixel electrode, the channel protection film having front edge facing the front edge of the gate electrode, and a distance between the front edge of the gate electrode and the front edge of the channel protection film being 0.2–1.2 μm.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently embodiments of the invention, and together with the general description given above and the detailed description of the embodiments given below, serve to explain the principles of the invention.

DETAILED DESCRIPTION OF THE INVENTION

The First Embodiment

Figure 1:
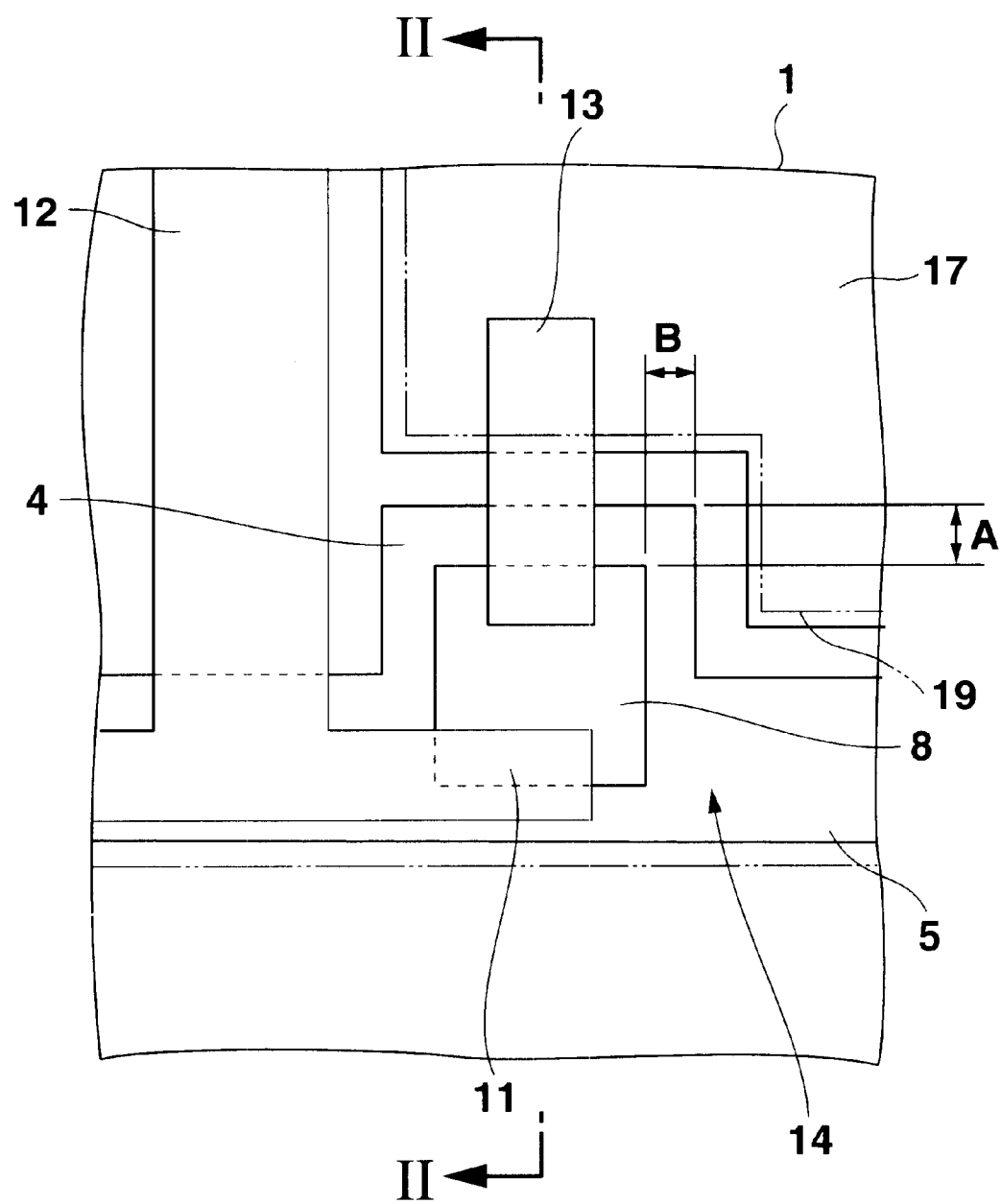
FIG. 1 is an enlarged plan view showing a part of a liquid crystal display device according to the first embodiment of the present invention.
Figure 2:
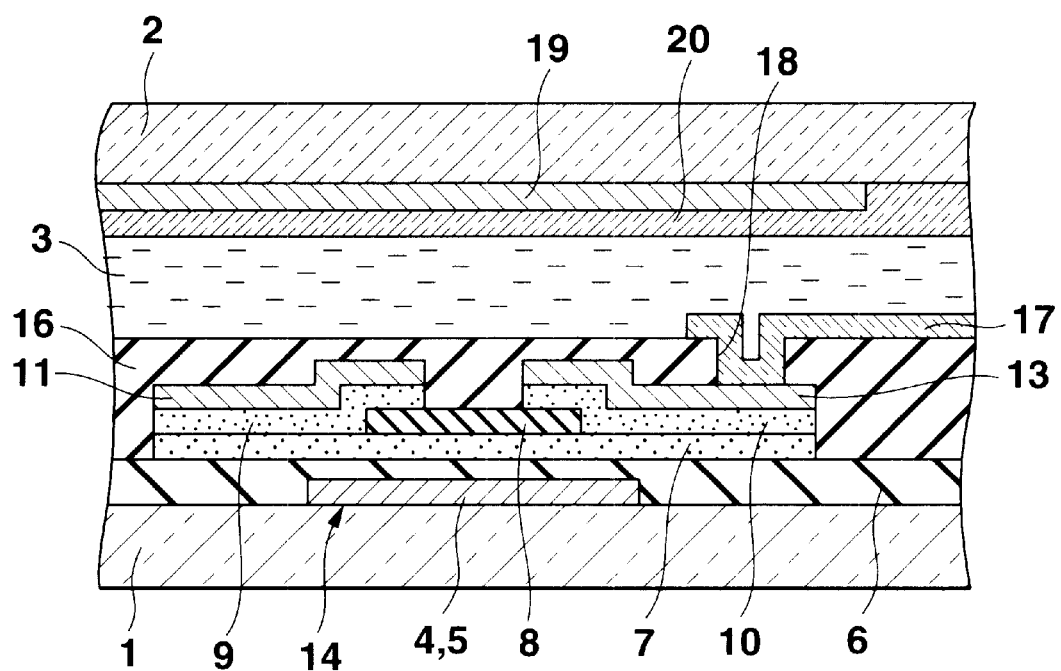
FIG. 2 is an enlarged sectional view of the liquid crystal display device taken along a line II—II shown in FIG. 1.

FIG. 1 is an enlarged plan view showing a part of a liquid crystal display device according to the first embodiment of the present invention, and FIG. 2 is an enlarged sectional view of the liquid crystal display device taken along a line II—II shown in FIG. 1. The liquid crystal display device shown in the figures is provided with a lower glass substrate 1 and an upper glass substrate 2 bonded to each other to hold therebetween a sealing member (not shown) formed in an approximately square frame, and contains liquid crystal 3 between the glass substrates 1 and 2.

The lower glass substrate 1 is provided at a predetermined portions on the upper face thereof with scanning lines 5 each including a gate electrode 4 and formed of shielding metal material. The scanning line 5 extends in a direction from left to right in FIG. 1. The lower glass substrate 1 provided with the gate electrode 4 and the scanning line 5 also has on the upper face a gate insulating film 6 formed of silicon nitride or the like. There is provided a semiconductor thin film 7 formed of intrinsic amorphous silicon on a portion of the upper face of the gate insulating film 6, which is placed directly or substantially above the gate electrode 4. On the upper face of the central portion of the channel width of the semiconductor thin film 7, there is provided a channel protection film 8 formed of silicon nitride or the like. The upper face of the side portions of the channel protection film 8 and the upper faces of source and drain regions of the semiconductor thin film 7 are covered with ohmic contact layers 9 and 10 formed of n-type amorphous silicon.

There are provided signal lines 12 each including a drain electrode 11 and formed of shielding metal material on the predetermined portion of the upper faces of the ohmic contact layer 9 and the gate insulating film 6. In FIG. 1, the signal line 12 extends in a direction from the upper portion to the lower portion of the drawing. The other ohmic contact layer 10 is provided on the upper face with a source electrode 13 formed of shielding metal material. The above-mentioned members, i.e., the gate electrode 4, the gate insulating film 6, the semiconductor thin film 7, the channel protection film 8, the ohmic contact layers 9 and 10, the drain electrode 11, and the source electrode 13 constitute a thin film transistor 14.

There is provided on the gate insulating film 6 an overcoat film 16 so as to entirely cover the thin film transistor 14. The overcoat film 16 is provided on the predetermined portion of the upper face with a plenty of pixel electrodes 17 formed of transparent metal material such as ITO. Each of the pixel electrodes 17 is connected to the source electrode 13 of the corresponding thin film transistor through a contact hole 18 formed in the overcoat film 16. On the other hand, there are provided a black mask 19 and a counter electrode 20 which are formed of metal material such as chromium oxide with relatively low reflectivity, such that the upper glass substrate 2 contacts with them on the lower face. The black mask 19 is formed in a rectangular frame and provided to each of the pixel electrodes so as to enclose the pixel region. The frame is shown in FIG. 1 as a two-dot line, that is arranged to face the scanning line 5 including the gate electrode 4 and the signal line 12 including the drain electrode 11. There is normally provided a first alignment film on the overcoat film 16 and the pixel electrode 17 on lower glass substrate 1, a second alignment film on the counter electrode 20 formed on the glass substrate 2. FIGS. 1 and 2, however, omit these alignment films.

The channel protection film 8 is formed by the photolithography technique with use of a mask formed of photoresist subjected to the exposure from the back side (back side exposure) with use of the gate electrode 4 as a mask and the exposure from the front side (front side exposure) with use of a mask (not shown) and the development. In the backside exposure using the gate electrode 4 as a mask, the photoresist is formed in a size a little smaller than that of the gate electrode 4 in area since light comes inside from the peripheral portion of the gate electrode 4 and the scanning line 5. The distance between the edge of the gate electrode 4 in the direction of the channel length and the edge of the channel protection film 8 in the direction of the channel length is determined as a value A ($\mu$m), and a distance between the edge of the gate electrode 4 in the direction of the channel width and the edge of the channel protection film 8 in the direction of the channel width is determined as a value B ($\mu$m).

Figure 3:
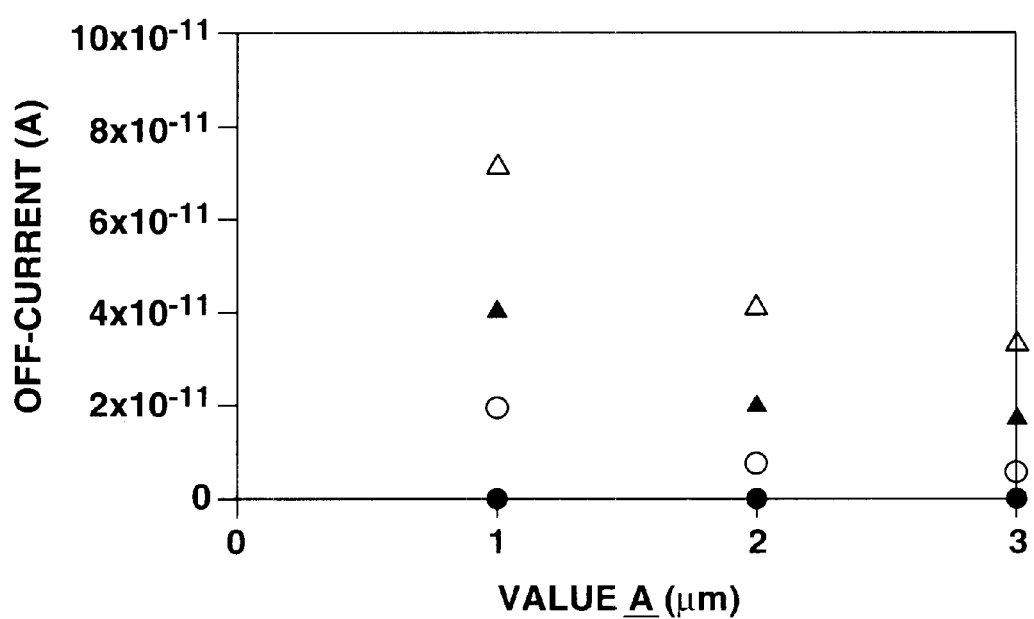
FIG. 3 is a graph showing a relationship between the value of Off-current of a thin film transistor and a value A.

When the liquid crystal display device as mentioned above is used as a transmissive display, and the brightness of the backlight (not shown) arranged on the lower face of the lower glass substrate 1 is varied to study the relationship between the Off-current of the thin-film transistor 14 and the value A, the result as shown in the graph of FIG. 3 was obtained. In this study, the thickness of the semiconductor thin film 7 is set at 500 Å, and the value B is set at 1–2 $\mu$m. Similarly, the study of the relationship between the Off-current of the thin-film transistor 14 and the thickness of the semiconductor thin film 7 had the result shown in the graph of FIG. 4, and the study of the relationship between the On-current of the thin-film transistor 14 and the thickness of the semiconductor thin film 7 had the result shown in the graph of FIG. 5. In these studies, the value A is set at 0.2–1.2 $\mu$m, and the value B is set at 1–2 $\mu$m. The Off-current values in the studies shown in FIGS. 3 and 4 were obtained in a condition where the drain voltage is fixed at 10V and the gate voltage is set at −5V. The On-current value in the study shown in FIG. 5 was obtained in a condition where the drain voltage is fixed at 10V and the gate voltage is set at +15V. The symbols of black ball, white ball, black triangle, and white triangle respectively represent four cases where the brightness of the backlight is set at 0 cd/m$^2$, 1500 cd/m$^2$, 3000 cd/m$^2$, and 5400 cd/m$^2$. The values A and B can be easily controlled by varying the light intensity and the irradiation time of the back side exposure.

Figure 4:
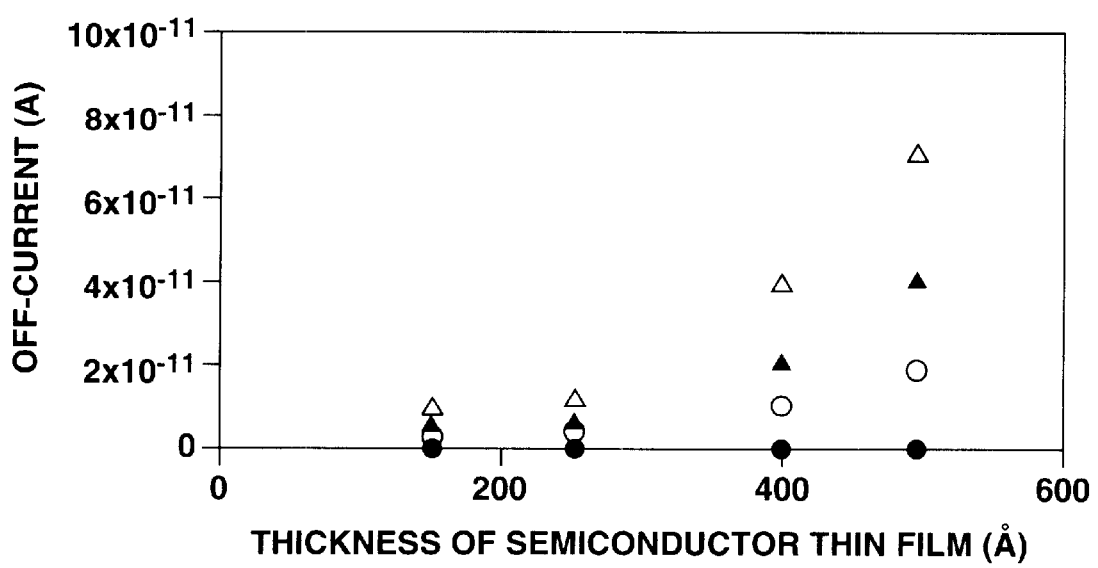
FIG. 4 is a graph showing a relationship between the value of Off-current of a thin film transistor and a thickness of the semiconductor thin film.
Figure 5:
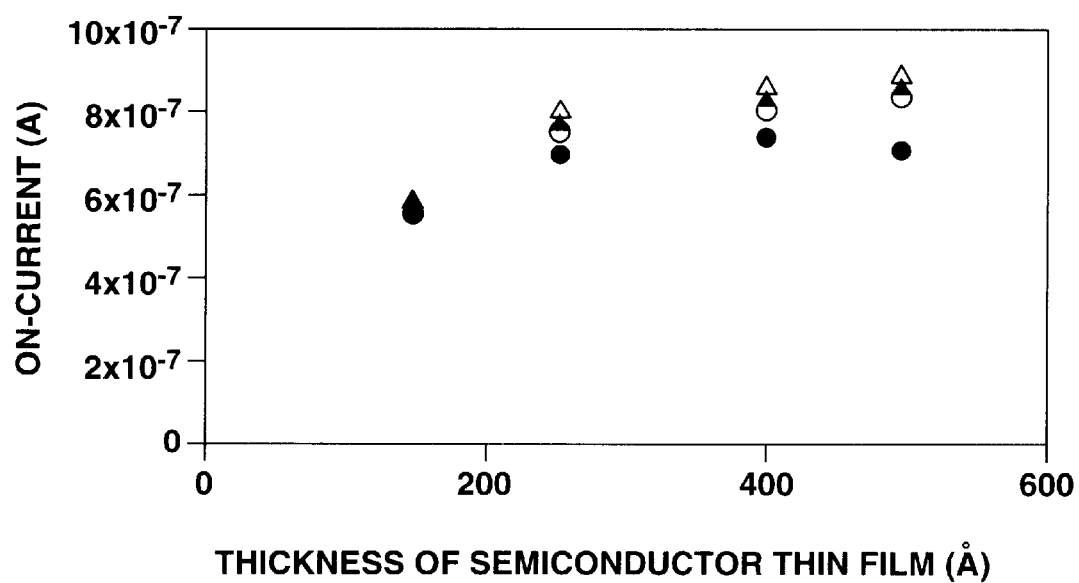
FIG. 5 is a graph showing a relationship between the value of On-current of a thin film transistor and a thickness of the semiconductor thin film.

As should be clear from the graph of FIG. 3, when the thickness of the semiconductor thin film 7 is set at 500 Å, the Off-current (leak current) is increased as the value A is decreased. Especially, when the value A is set at 1 $\mu$m or less, the value of the Off-current is increased to a non-preferable level. In the next study shown in FIG. 4, therefore, the value A was set at 0.2–1.2 $\mu$m to decrease the leak current to a preferable level, and the thickness of the semiconductor thin film 7 was varied. As a result of this study, the Off-current was decreased to a preferable level as the thickness of the semiconductor thin film 7 was decreased. When the thickness of the semiconductor thin film 7 was decreased, however, the On-current was also decreased as shown in FIG. 5, which results in the non-preferable deterioration of the performance of the device. In order to attain both the suppression of the leak current and the prevention of the decrease of the On-current, the preferable scope of the thickness of the semiconductor thin film 7 was determined from the studies shown in FIGS. 4 and 5. The graph of FIG. 4 shows that the Off-current is increased when the thickness of the semiconductor thin film 7 is set at 400 Å or more, which results in the deterioration of the display performance. Accordingly, it is preferable to set the thickness of the semiconductor thin film 7 below 400 Å. On the other hand, the graph of FIG. 5 shows that the On-current is decreased when the thickness of the semiconductor thin film 7 is set below 200 Å, which also results in the deterioration of the display performance. Accordingly, it is preferable to set the thickness of the semiconductor thin film 7 200 Å or more.

As should be clear from the above studies, when the thickness of the semiconductor thin film 7 is set not less than 200 Å and less than 400 Å, the Off-current (leak current) can be decreased with little adverse effect to the On-current, even if the value A is set at 0.2–1.2 $\mu$m and the value B is set at 1–2 $\mu$m. The graph of FIG. 4 further suggests that the Off-current (leak current) can be more decreased when the thickness of the semiconductor thin film 7 is set around 350 Å. It is thus more preferable to set the thickness of the semiconductor thin film 7 at 200–350 Å. Similarly, in consideration that the precision of the backside exposure is around 0.5 $\mu$m, it is also preferable to set the value A at 0.5–1.2 $\mu$m. It goes without saying that the value B should be set in a range between 0.2 and 1.2 $\mu$m, more preferably, at a 0.5–1.2 $\mu$m.

Incidentally, the liquid crystal display device shown in FIGS. 1 and 2 is formed such that the drain electrode 11 of the thin film transistor 14 is protruded from the signal line 12 in the row direction, and thus a horizontally L-shaped groove needs to be formed to separate the source electrode 13 from the drain electrode 11 and the signal line 12 since the drain electrode 11 and the signal line 12 are arranged near the source electrode 13. The horizontal L-shaped groove is formed by forming a photoresist film on the signal line 12 including the drain electrode 11 and the source electrode 13, and etching the shielding metal material with use of the photoresist film as a mask. The photoresist film used for forming the groove is, however, rather thick, and thus the etching solution will not flow easily into the horizontal L-shaped groove, which will impede the progress of the etching process. As a result, process malfunction occurs, which may cause short-circuit between the scanning signal line 12 including the drain electrode 11 and the source electrode 13.

The liquid crystal display device enable to prevent the short-circuit between the drain electrode 11 and the source electrode 13 will be described below as the second embodiment of the present invention.

The Second Embodiment

Figure 6:
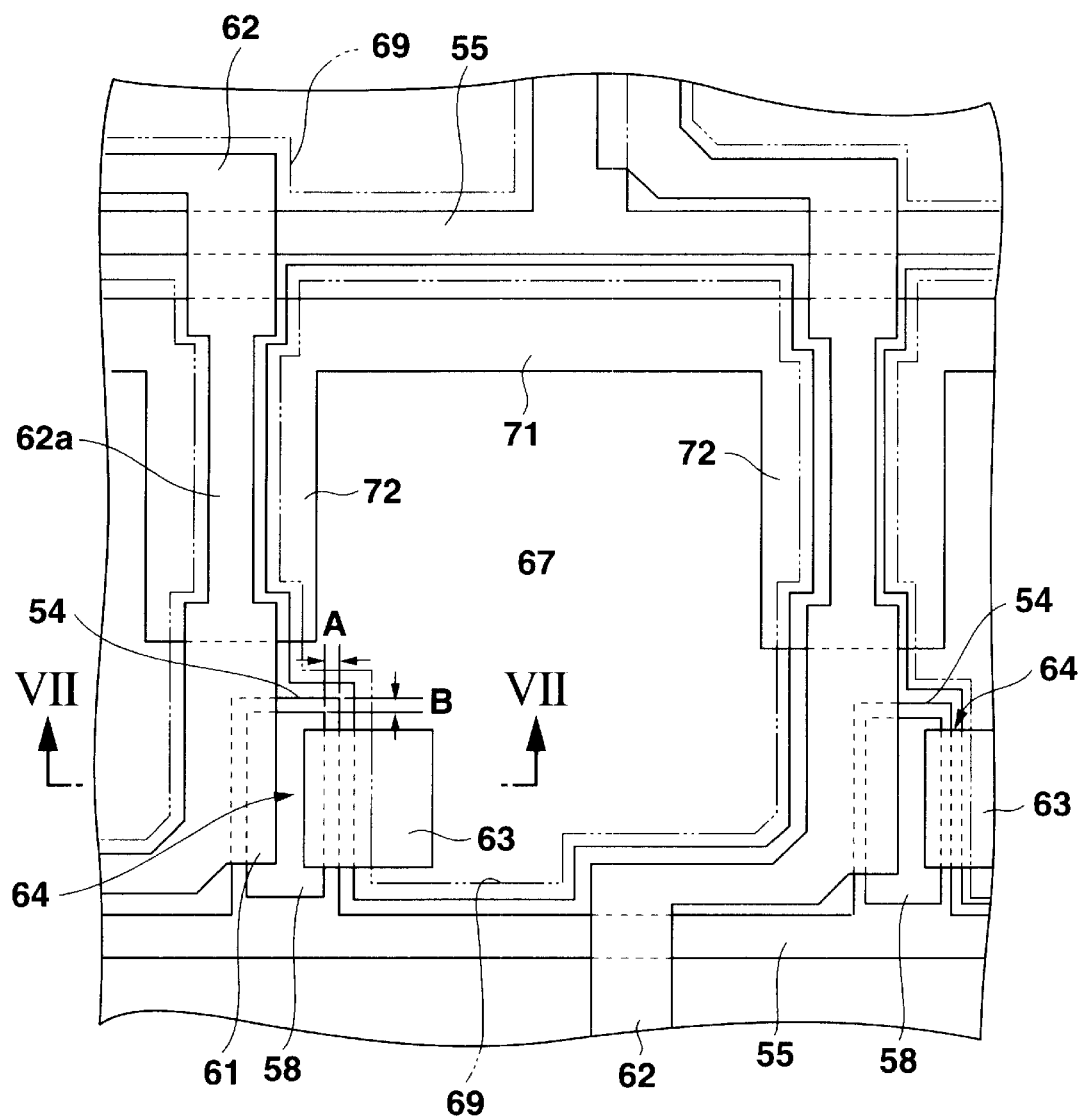
FIG. 6 is an enlarged plan view showing a main part of a liquid crystal display device according to the second embodiment of the present invention.

FIG. 6 is an enlarged plan view showing a main part of a liquid crystal display device according to the second embodiment of the present invention. The liquid crystal display device has three pixel electrodes 67, i.e., R, G, and B constituting one pixel, which are respectively arranged as apexes of an isosceles triangle. A scanning line 55 is arranged linearly between upper and lower pixel electrodes 67 vertically adjacent to each other in the row direction. A signal line 62 is arranged in a meandering manner in the column direction between left and right pixel electrodes 67 horizontally adjacent to each other and between upper and lower pixel electrodes 67 vertically adjacent to each other.

One side edge of the signal line 62 which faces a thin film transistor 64 is formed to linearly extend in the column direction and functions as a drain electrode 61. The thin film transistor 64 is formed such that a gate electrode 54, the drain electrode 61, and the source electrode 63 are arranged horizontally in the column direction. In other words, the channel of the transistor extends in the column direction. The gate electrode 54 is formed as a rectangular having longer sides in the column direction and shorter sides in the row direction, and protrudes from the scanning line 55. The source electrode 63 is formed on a channel protection film 58 to face the drain electrode 61, and extends along the scanning line 55 to be connected to the pixel electrode 67. Both sides (front edge and rear edge) of the channel protection film 58 in the channel length direction of the thin film transistor 64 and a side (side edge) adjacent to the pixel electrode 67 in the channel width direction are formed in a self-alignment manner with respect to the gate electrode 54. The side edges (front edge and rear edge) of the channel protection film 58 in the channel length direction of the thin film transistor are positioned inside by the value A from the side edges of the gate electrode 54 in the same direction, while, the side edge in the channel width direction is positioned inside by the value B from the side edge of the gate electrode 54 in the same direction.

There is provided a supplemental capacity line 71 below the upper side of the pixel electrode linearly in the row direction. The supplemental capacity line 71 has a pair of supplemental capacity electrodes 72 extending to the side of the pixel electrode 67. The supplemental capacity electrodes 72 are arranged to overlap with a part of a right side of the left pixel electrode 67 and a part of a left side of the right pixel electrode 67, and placed under the signal line 62 between the left and right pixel electrodes. The signal line 62 is formed a little wider in portions crossing the scanning line 55, overlapping the peripheral parts of the supplemental capacity electrodes 72, and placing aside the thin film transistor 64, in comparing with the other portion. In other words, a middle portion 62a of the signal line 62, which extends in the column direction, is formed narrow. This is because, the area shielded by the signal line 62 needs to be decreased to increase the aperture ratio. To prevent the wiring from being cut at steps, the signal line 62 is formed a little wider at the above-mentioned portions overlapping the scanning line 55 and the peripheral parts of supplemental capacity electrodes 72. The channel protection film 58 of the thin film transistor 64, which faces the drain electrode 61, is arranged to overlap the scanning line 55 such that the left side of the channel protection film 58 is positioned inside with respect to the above-mentioned narrow middle portion 62a of the signal line 62. By placing the thin film transistor 64 possibly near the signal line 62 in this manner, the aperture ratio is increased. It should be noted that the length of the middle portion 62a of the signal line 62 is shown much shorter than the actual length due to the smallness of the drawing. The area 69 enclosed by a two-dot line in FIG. 6 is a black matrix.

Figure 7:
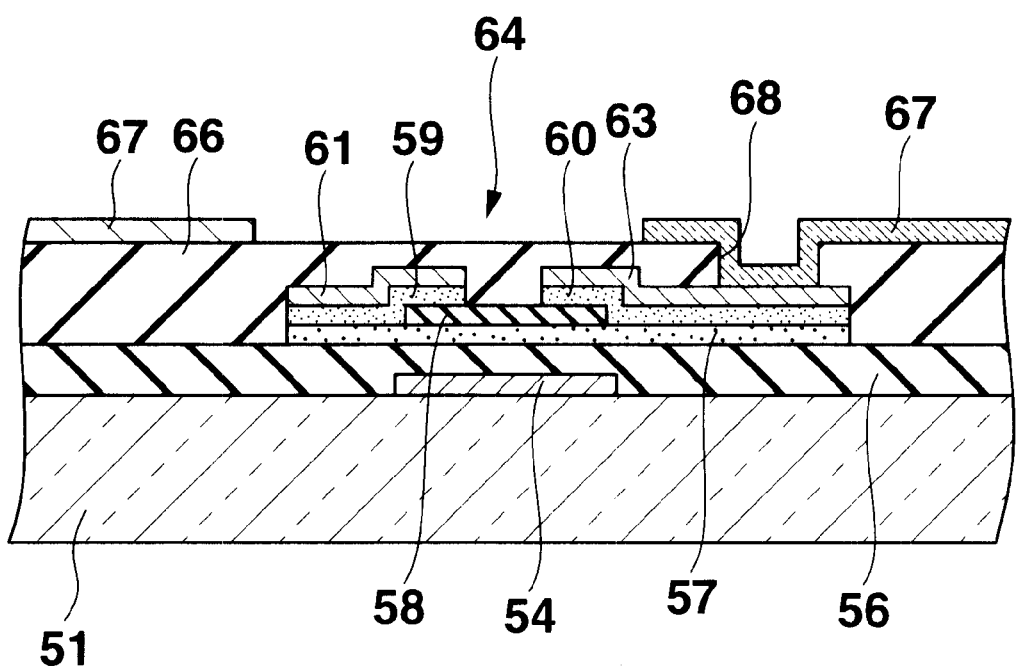
FIG. 7 is an enlarged sectional view of the liquid crystal display device taken along a line VII—VII shown in FIG. 6.

The following is the description of the specific structure of a part of the liquid crystal display device in conjunction with FIG. 7 as the enlarged sectional view of the liquid crystal display device taken along a line VII—VII shown in FIG. 6. The glass substrate 51 is provided at predetermined portions on the upper face thereof with scanning lines 55 each including a gate electrode 54. The glass substrate 51 provided at the other predetermined portions on the upper face thereof with the supplemental capacity lines 71 (not shown in FIG. 7) each including the supplemental capacity electrode 72. The upper face of the glass substrate 51 is entirely covered with the gate insulating film 56 formed of silicon nitride or the like. There is provided the semiconductor thin film 57 formed of intrinsic amorphous silicon on a portion of the upper face of the gate insulating film 56 on the gate electrode 54. On a predetermined portion of the upper face of the semiconductor thin film 57, there is provided the channel protection film 58 formed of silicon nitride or the like. The upper face of the side portions of the channel protection film 58 and the upper faces of the semiconductor thin film 57 are covered with ohmic contact layers 59 and 60 formed of n-type amorphous silicon.

There is provided the signal line 62 including the drain electrode 61 on the predetermined portion of the upper faces of the ohmic contact layer 59 and the gate insulating film 56. The other ohmic contact layer 60 is provided on the upper face with the source electrode 63. There is provided on the gate insulating film 56 the overcoat film 66 formed of silicon nitride or the like so as to entirely cover the signal line 62 and the source electrode 63. There is provided a contact hole 68 in the overcoat film 66 so as to contact with the predetermined portion of the source electrode 63. The pixel electrode 67 is formed on a predetermined portion on the upper face of the overcoat film 66 to be connected with the source electrode 63 through the contact hole 68. The above-mentioned members, i.e., the gate electrode 54, the gate insulating film 56, the semiconductor thin film 57, the channel protection film 58, the ohmic contact layers 59 and 60, the drain electrode 61, and the source electrode 63 constitute the thin film transistor 64.

Figure 8:
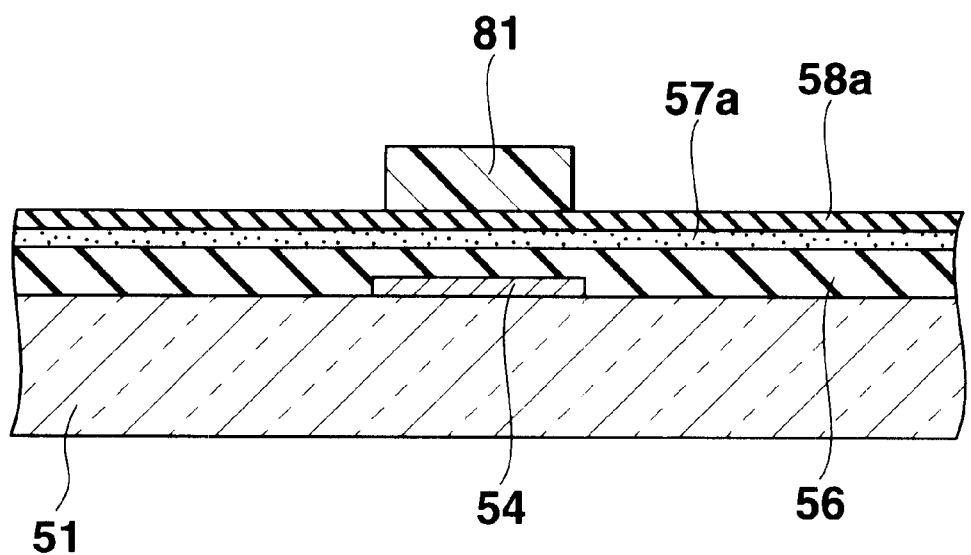
FIG. 8 is an enlarged sectional view for explaining the first manufacturing step of the thin film semiconductor device shown in FIGS. 6 and 7.

The following is the description of the manufacturing process of the above-mentioned liquid crystal display device with serial reference to FIGS. 8 to 12. As shown in FIG. 8, the scanning line 55 including the gate electrode 54 is formed at a predetermined portion on the upper face of the glass substrate 51 at first, and the supplemental capacity line 71 including the supplemental capacity electrode 72 is formed on the other predetermined portion on the upper face of the glass substrate 51. Next, on the entire upper face of the glass substrate 51, on which the scanning line and the supplemental capacity line are formed, the gate insulating film 56 formed of silicon nitride or the like, a semiconductor thin film 57a formed of intrinsic amorphous silicon, and a channel protection film forming film 58a formed of silicon nitride or the like, are serially deposited.

Subsequently, a photoresist film 81 for forming the channel protection film is formed on the predetermined portion of the upper face of the channel protection film forming film 58a on the gate electrode 54 by the back side exposure with use of the gate electrode 54 as a mask and by the front side exposure with use of an exposure mask on the front side. In this step, the photoresist film 81 is aligned by the back side exposure with use of the gate electrode 54 as a mask, i.e., aligned in a position by the self-alignment manner such that the values A and B are set at appropriate values.

Figure 9:
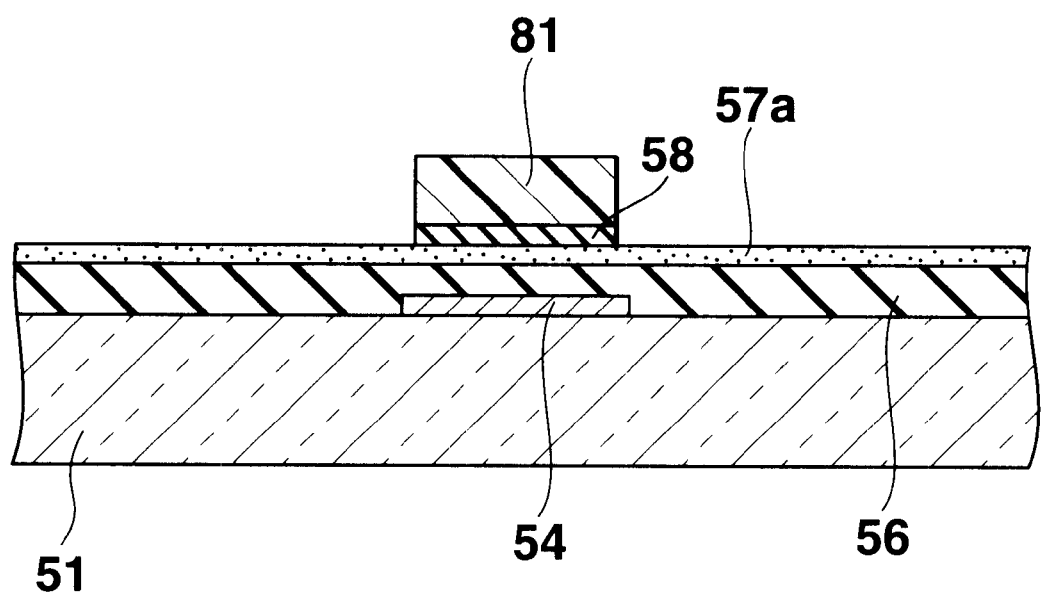
FIG. 9 is an enlarged sectional view for explaining the manufacturing step following the first step shown in FIG. 8.

Next, the film 58a is selectively etched with use of the photoresist film 81 as a mask to form the channel protection film 58 below the photoresist film 81, as shown in FIG. 9. Similarly to the first embodiment, when the thickness of the semiconductor thin film 57 (57a) is not less than 200 Å and less than 400 Å, it is preferable to form the channel protection film 58 such that the value A is set within a range of 0.2–1.2 μm and the value B is set within a range of 1–2 μm. In this embodiment, however, it is possible to set the values A and B at the same value by the backside exposure. If the values A and B are set at the same value, the range of 1–1.2 μm is the most preferable, but the range of 0.5–1.5 μm can also sufficiently satisfy the requirement. The positions of the edge (side edge) of the channel protection film 58 and the edge (side edge) on the opposite side, which determine the value B, are determined by the front side exposure. After the above-mentioned step, the photoresist film 81 is removed.

Figure 10:
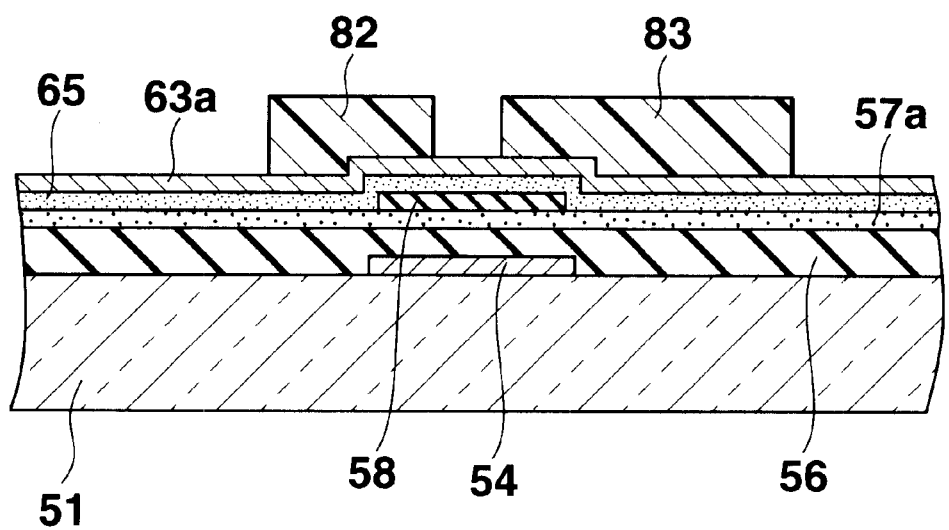
FIG. 10 is an enlarged sectional view for explaining the manufacturing step following the step shown in FIG. 9.
Figure 11:
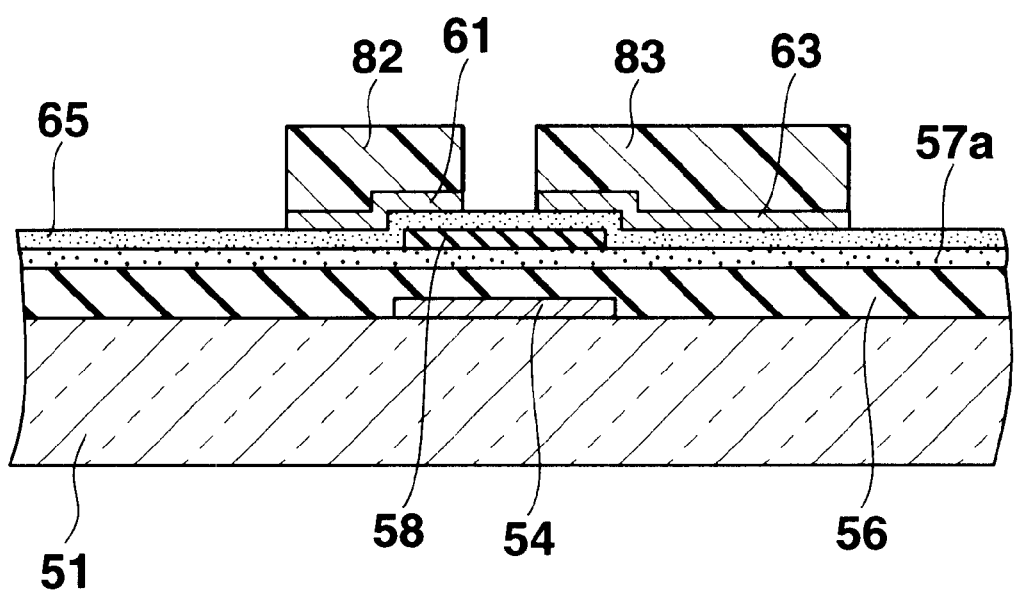
FIG. 11 is an enlarged sectional view for explaining the manufacturing step following the step shown in FIG. 10.

Next, the ohmic contact layer 65 formed of n-type amorphous silicon and a metal film 63a formed of chromium or the like are serially deposited on the entire upper face of the semiconductor thin film 57a including the channel protection film 58 such that the metal film 63a is directly stacked on the ohmic contact layer 65, as shown in FIG. 10. Subsequently, photoresist films 82 and 83 are respectively formed on predetermined portions on the upper face of the metal film 63a. In this time, the photoresist film 82 is provided to form the signal line 62 including the drain electrode 61, and the photoresist film 83 is provided to form the source electrode 63. After forming the photoresist films, the metal film is subjected to the wet etching process with use of the photoresist films 82 and 83 to form the signal line 62 including the drain electrode 61 below the photoresist film 82 and the source electrode 63 below the photoresist film 83, as shown in FIG. 11.

The above-mentioned liquid crystal display device is formed such that the arrangement of the gate electrode 54, the drain electrode 61, and the source electrode 63 of the thin film transistor 64 is performed in the row direction, in other words, the channel length direction of the transistor equals to the row direction. In such a constitution, the groove between the source electrode 63 and the signal line 62 including the drain electrode 61 is formed to extend linearly in the column direction that is the same as the arrangement direction of the signal line 62. Therefore, the groove between the photoresist films 82 and 83 formed on the drain electrode 61 and the source electrode 63 is also formed to extend linearly in the column direction that is the same as the arrangement direction of the signal line 62. With this constitution, the etching solution used in the wet etching process wherein the metal film 63a is etched with use of the photoresist films 82 and 83 easily flows into the groove, resulting that short-circuit due to the process malfunction between the signal line 62 including the drain electrode 61 and the source electrode 63 can be prevented from easily occurring. If the channel length, i.e., the distance between the drain electrode 61 and the source electrode 63 is set large to some extent, the etching solution can flow more easily into the groove.

Figure 12:
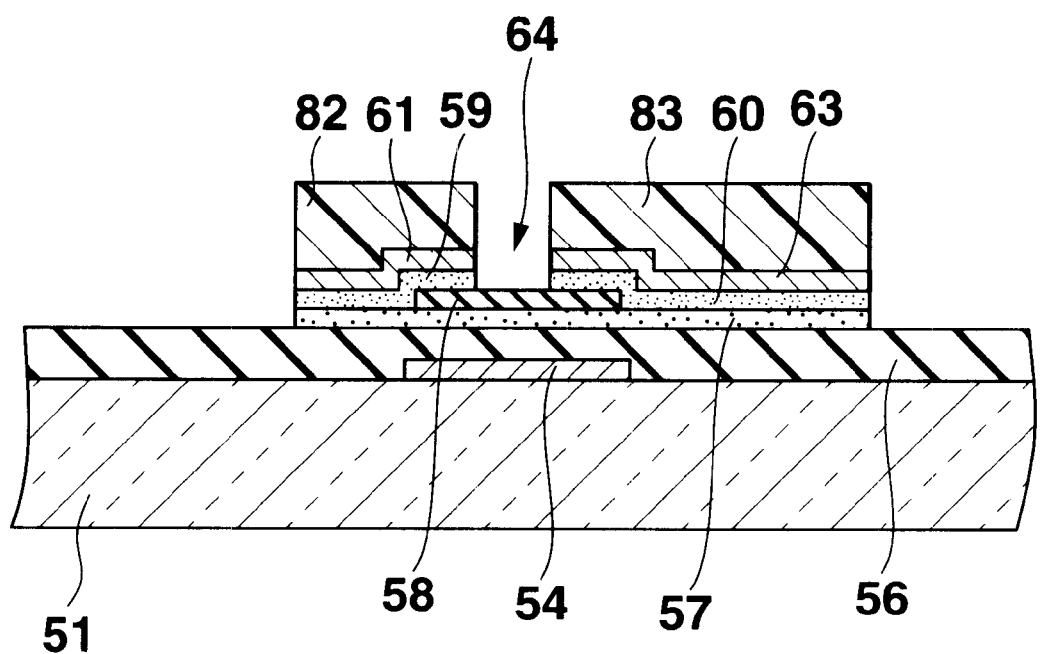
FIG. 12 is an enlarged sectional view for explaining the manufacturing step following the step shown in FIG. 11.
Figure 13:
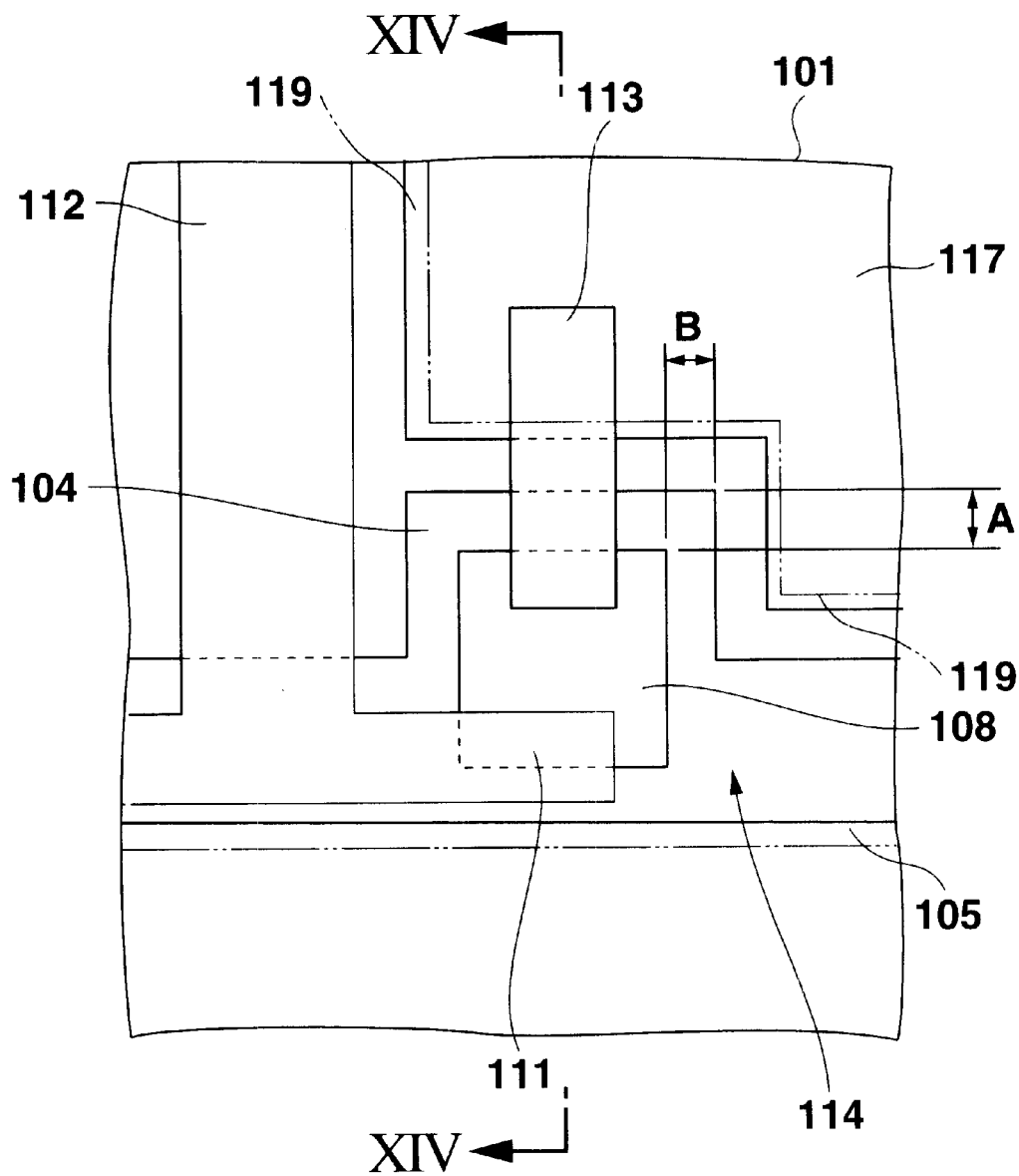
FIG. 13 is an enlarged plan view showing a part of the conventional liquid crystal display device.
Figure 14:
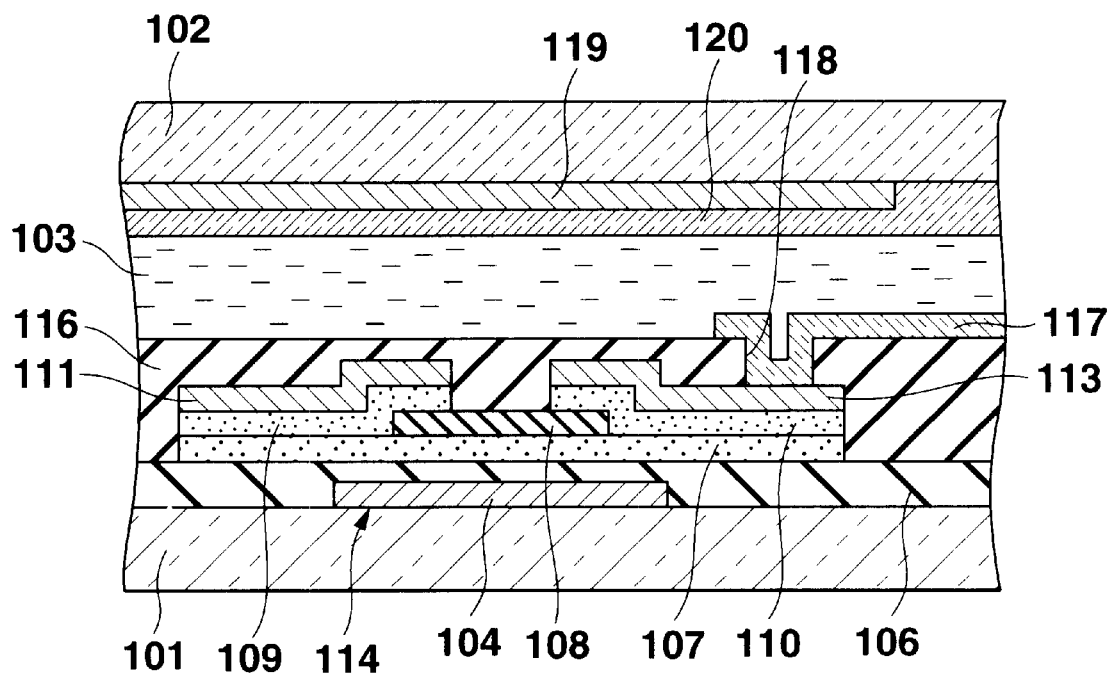
FIG. 14 is an enlarged sectional view of the liquid crystal display device taken along a line XIV—XIV shown in FIG. 13.

Next, with use of the photoresist films 82 and 83, the drain electrode 61, and the source electrode 63 as a mask, the ohmic contact layer 65 and the semiconductor thin film 57a are subjected to the dry etching process to form the ohmic contact layer 59 below the drain electrode 61 and the other ohmic contact layer 60 below the source electrode 63, as shown in FIG. 12. With this etching, the semiconductor thin film 57 is also formed below the ohmic contact layers 59 and 60 and the channel protection film 58. After the etching process, the photoresist films 82 and 83 are removed.

Subsequently, the overcoat film 66 formed of silicon nitride is deposited on the entire upper face of the gate insulating film 56 including the thin film transistor 64 and the like, as shown in FIG. 7. Next, the contact hole 68 is formed on the portion of the overcoat film 66, which corresponds to the predetermined portion of the source electrode 63. After forming the contact hole, the pixel electrode 67 is formed on a predetermined portion on the upper face of the overcoat film 66 such that the pixel electrode 67 is connected with the source electrode 63 via the contact hole 68.

The structure described in the second embodiment can be applied irrelevantly from the reduction of the leak current. In other words, even if the thickness of the semiconductor thin film and the value A as the distance between the edge in the direction of the channel length of the gate electrode and the edge in the direction of the channel length of the channel protection film are set at the conventional values, the short-circuit due to the process malfunction between the drain electrode and the source electrode can be prevented. Similarly, though the above-mentioned embodiment relates to the case where the present invention is applied to the liquid crystal display device with the delta arrangement, it goes without saying that the present invention can be applied to the liquid crystal display device with the other arrangement such as the stripe arrangement. Further, the structure wherein the pixel electrode is formed on the overcoat film covering the thin film transistor is employed in the above-mentioned embodiment, but the present invention can be also applied to the structure wherein the pixel electrode is formed on the gate insulating film and the thin film transistor and the pixel electrode are covered with the overcoat film.

As described above, according to the present invention, the thickness of the semiconductor thin film is set not less than 200 Å and less than 400 Å (more preferably, around 200–350 Å) and the distance between the edge of the gate electrode and the edge of the channel protection film is set around 0.2–1.2 $\mu$m. By setting them in this manner, the leak current of the thin film transistor due to the light irradiation can be reduced with little adverse effect to the On-current of the thin film transistor, with the result that the Off performance of the thin film transistor is improved to enhance the display performance.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A liquid crystal display device comprising:
   pixel electrodes formed of transparent conductive material;
   thin film transistors each provided with a gate electrode formed of shielding material and having a front edge, a rear edge, and a pair of side edges, a gate insulating film, a semiconductor thin film, a drain electrode, a source electrode, and a channel protection film smaller than the gate electrode, a thickness of the semiconductor thin film being at least 200 Å and less than 400 Å,
   each of the pixel electrodes having a edge adjacent to the front edge and one of the side edges of the gate electrode, the source electrode extending over the front edge of the gate electrode to be connected with the pixel electrode, the channel protection film having front edge facing the front edge of the gate electrode, and a distance between the front edge of the gate electrode and the front edge of the channel protection film being 0.2–1.2 $\mu$m.

2. The liquid crystal display device according to claim 1, wherein the thickness of the semiconductor thin film is at least 200 Å and not more than 350 Å.

3. The liquid crystal display device according to claim 1, wherein the distance between the front edge of the gate electrode and the front edge of the channel protection film is 0.5–1.2 $\mu$m.

4. The liquid crystal display device according to claim 1, wherein the channel protection film has a side edge facing one of the side edges of the gate electrode, which is adjacent to the pixel electrode, and a distance between the one of the side edges of the gate electrode and the side edge of the channel protection film is 1–2 μm.

5. The liquid crystal display device according to claim 1, wherein the channel protection film has a front edge and a side edge respectively facing the front edge of the gate electrode and the one of the side edges of the gate electrode, which is adjacent to the pixel electrode, a distance between the front edge of the gate electrode and the front edge of the channel protection film and a distance between the one of the side edges of the gate electrode and the side edge of the channel protection film are respectively 0.5–1.5 μm.

6. The liquid crystal display device according to claim 5, wherein the distance between the front edge of the gate electrode and the front edge of the channel protection film and the distance between the one of the side edges of the gate electrode and the side edge of the channel protection film are substantially equal to each other.

7. The liquid crystal display device according to claim 1, further comprising a black mask covering the gate electrode and the edge of the pixel electrode.

8. The liquid crystal display device according to claim 1, wherein the gate electrode is connected to a scanning line, the drain electrode is formed as a part of a signal line formed in a direction orthogonal to the scanning line, and the source electrode is formed along the scanning line so as to face the drain electrode.

9. The liquid crystal display device according to claim 8, wherein the channel protection film has a front edge and a side edge respectively facing the front edge of the gate electrode and the one of the side edges of the gate electrode, which is adjacent to the pixel electrode, a distance between the front edge of the gate electrode and the front edge of the channel protection film and a distance between the one of the side edges of the gate electrode and the side edge of the channel protection film are respectively 0.5–1.5 μm.

10. The liquid crystal display device according to claim 8, wherein the liquid crystal display device has a supplemental capacity line formed to face the scanning line and having a pair of supplemental capacity electrodes, the signal line is provided in a region facing the supplemental capacity electrodes with at least a middle portion formed narrower than the other portion thereof.

11. The liquid crystal display device according to claim 10, wherein the pixel electrode is formed to have a portion which faces the middle portion of the signal line and is formed wider than the other portion thereof.

12. The liquid crystal display device according to claim 8, further comprising a black mask covering at least the gate electrode and the edge of the pixel electrode.

13. A liquid crystal display device comprising:
pixel electrodes formed of transparent conductive material; and
thin film transistors each provided with a gate electrode formed of shielding material, a gate insulating film, a semiconductor thin film, a drain electrode, a source electrode, and a channel protection film a little smaller than the gate electrode, a thickness of the semiconductor thin film being at least 200 Å and less than 400 Å,
wherein the respective transistors have a value A as a distance between an edge of the gate electrode in a channel length direction and an edge of the channel protection film being 0.2–1.2 μm.

14. A liquid crystal display device comprising:
pixel electrodes formed of transparent conductive material;

thin film transistors each provided with a gate electrode formed of shielding material and having a front edge, a rear edge, and a pair of side edges, a gate insulating film, a semiconductor thin film, a drain electrode, a source electrode, and a channel protection film a little smaller than the gate electrode, a thickness of the semiconductor thin film being at least 200 Å and not more than 350 Å,
wherein the pixel electrode has an edge adjacent to the front edge and one of the side edges of the gate electrode, the source electrode extends over the front edge of the gate electrode to be connected with the pixel electrode, the channel protection film has a front edge facing the front edge of the gate electrode and a side edge facing the one of the side edges of the gate electrode, which is adjacent to the pixel electrode, and a distance between the front edge of the gate electrode and the front edge of the channel protection film and a distance between the one of the side edges of the gate electrode and the side edge of the channel protection film are 0.5–1.5 μm.

15. A liquid crystal display device comprising:
a plurality of scanning lines each having a gate electrode and formed to extend in a row direction;
a plurality of gate insulating films each formed at least on corresponding one of the gate electrodes;
a plurality of semiconductor thin films each formed on corresponding one of the gate insulating films;
a plurality of channel protection films each formed on corresponding one of the semiconductor thin films and having a little smaller area than that of the gate electrode;
a plurality of signal lines each having a drain electrode and formed to extend in a column direction;
a plurality of pixel electrodes each formed in a corresponding one of regions enclosed by the scanning lines and the signal lines; and
a plurality of source electrodes each connecting the semiconductor thin film and corresponding one of the pixel electrodes,
wherein each of the gate electrodes is formed in a rectangular having longer sides in the column direction and shorter sides in the row direction, each of the drain electrodes extends as a part of corresponding one of the signal lines linearly in the column direction, and each of the source electrodes extends in the row direction through corresponding one of the channel protection films so as to face corresponding one of the drain electrodes.

16. The liquid crystal display device according to claim 15, wherein each of the gate electrodes has a front edge adjacent to corresponding one of the pixel electrodes and a side edge, each of the channel protection films has a front edge facing the front edge of corresponding one of the gate electrodes and a side edge facing the side edge of corresponding one of the gate electrodes, a distance between the front edge of each of the gate electrodes and the front edge of corresponding one of the channel protection films and a distance between the side edge of each of the gate electrodes and the side edge of corresponding one of the channel protection films are respectively 0.5–1.5 μm.

17. The liquid crystal display device according to claim 15, wherein the thickness of the semiconductor thin films is at least 200 Å and not more than 350 Å.

* * * * *